(12) United States Patent
Wang et al.

(10) Patent No.: US 12,407,799 B2
(45) Date of Patent: Sep. 2, 2025

(54) PROJECTION APPARATUS

(71) Applicants: Beijing BOE Display Technology Co., Ltd., Beijing (CN); BOE TECHNOLOGY GROUP CO., LTD., Beijing (CN)

(72) Inventors: Yujie Wang, Beijing (CN); Site Cai, Beijing (CN); Guangquan Wang, Beijing (CN); Wei Zhang, Beijing (CN); Xi Li, Beijing (CN); Jingang Wang, Beijing (CN); Xiaolong Liu, Beijing (CN); Chengwei Ji, Beijing (CN)

(73) Assignees: Beijing BOE Display Technology Co., Ltd., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 17/921,392

(22) PCT Filed: Feb. 28, 2022

(86) PCT No.: PCT/CN2022/078195
§ 371 (c)(1),
(2) Date: Oct. 26, 2022

(87) PCT Pub. No.: WO2023/159545
PCT Pub. Date: Aug. 31, 2023

(65) Prior Publication Data
US 2024/0388680 A1 Nov. 21, 2024

(51) Int. Cl.
*H04N 9/31* (2006.01)
(52) U.S. Cl.
CPC ........... *H04N 9/3167* (2013.01); *H04N 9/317* (2013.01)

(58) Field of Classification Search
CPC .. G03B 21/005; G03B 21/006; G03B 21/008; G03B 21/16; G03B 21/28; G03B 21/145;
(Continued)

(56) References Cited

U.S. PATENT DOCUMENTS

| 6,466,375 B1 | 10/2002 | Kanaya |
| 7,237,899 B2 | 7/2007 | Ma et al. |

(Continued)

FOREIGN PATENT DOCUMENTS

| CN | 1274093 A | 11/2000 |
| CN | 1792098 A | 6/2006 |

(Continued)

*Primary Examiner* — Sultan Chowdhury
(74) *Attorney, Agent, or Firm* — HOUTTEMAN LAW LLC

(57) ABSTRACT

A projection apparatus including: a light source component; a light polarization component for converting light from the light source component into first polarized light in a first polarization direction; a display panel on a side, away from the light source component, of the light polarization component for adjusting the polarization direction of the first polarized light to emit second polarized light in a polarization direction between the first polarization direction and a second polarization direction, the first polarization direction is perpendicular to the second polarization direction; a light reflective component on a side, away from the light polarization component, of the display panel for reflecting one of the polarized light in the first polarization direction and the polarized light in the second polarization direction; a projection lens, a light incident surface of which faces the light reflective component so as to receive light reflected by the light reflective component.

19 Claims, 6 Drawing Sheets

(58) Field of Classification Search
CPC .............. G03B 21/208; G03B 21/2033; G03B 21/2053; G03B 21/2073; H04N 9/315; H04N 9/317; H04N 9/3105; H04N 9/3108; H04N 9/3141; H04N 9/3144; H04N 9/3167
See application file for complete search history.

(56) References Cited

U.S. PATENT DOCUMENTS

| | | | |
|---|---|---|---|
| 9,122,140 | B2 | 9/2015 | Ouderkirk |
| 9,625,801 | B2* | 4/2017 | Baba .................... G03B 21/008 |
| 10,809,603 | B1 | 10/2020 | Xu |
| 10,955,666 | B2 | 3/2021 | Ouderkirk et al. |
| 10,969,672 | B2* | 4/2021 | Maeda ................. H04N 9/3105 |
| 11,493,677 | B2 | 11/2022 | Haag et al. |
| 11,561,443 | B2 | 1/2023 | Hu |
| 2014/0160364 | A1* | 6/2014 | Katou ................. G03B 21/2073 349/5 |
| 2018/0203338 | A1 | 7/2018 | Kawamura et al. |
| 2019/0049833 | A1* | 2/2019 | Maeda ................. G03B 21/008 |
| 2019/0394429 | A1* | 12/2019 | Tanaka ................. H04N 13/334 |

FOREIGN PATENT DOCUMENTS

| | | |
|---|---|---|
| CN | 201285471 Y | 8/2009 |
| CN | 101846860 A | 9/2010 |
| CN | 202281894 U | 6/2012 |
| CN | 103460089 A | 12/2013 |
| CN | 107709873 A | 2/2018 |
| CN | 109164667 A | 1/2019 |
| CN | 109407421 A | 3/2019 |
| CN | 209356835 U | 9/2019 |
| CN | 111650807 A | 9/2020 |
| CN | 212540990 U | 2/2021 |
| CN | 112782916 A | 5/2021 |
| CN | 113009758 A | 6/2021 |
| CN | 113419398 A | 9/2021 |
| CN | 214228367 U | 9/2021 |
| CN | 113608291 A | 11/2021 |
| CN | 215117143 U | 12/2021 |
| CN | 216670485 U | 6/2022 |
| JP | H 07319066 A | 12/1995 |

* cited by examiner

PROJECTION APPARATUS

TECHNICAL FIELD

The present disclosure relates to the field of display technology, and in particular to a projection apparatus.

BACKGROUND

A projection apparatus is a display device which magnifies and images tiny image information on a screen through a lens, and is widely applied to daily life of people, such as teaching, business, media advertisement, home entertainment and the like.

SUMMARY

The present disclosure provides a projection apparatus, including:
- a light source component;
- a light polarization component located on a light exiting side of the light source component and configured to convert light emitted from the light source component into first polarized light polarized in a first polarization direction;
- a display panel located on a side, away from the light source component, of the light polarization component and configured to adjust a polarization direction in which the first polarized light is polarized so as to emit second polarized light; a polarization direction in which the second polarized light is polarized is between the first polarization direction and a second polarization direction, and the first polarization direction is perpendicular to the second polarization direction;
- a light reflective component located on a side, away from the light polarization component, of the display panel and configured to reflect one of polarized light polarized in the first polarization direction and polarized light polarized in the second polarization direction; and
- a projection lens, a light incident surface of which faces the light reflective component so as to receive light reflected by the light reflective component.

In some implementations, the light source component includes a light source, a second reflective layer, and a second lens;
the second lens is arranged between the light source and the light polarization component and is configured to collimate light directly irradiated to the second lens by the light source, and the second lens includes a Fresnel lens;
the second reflective layer is located between the light source and the second lens and is arranged surrounding an optical axis of the second lens to form a cylindrical structure having a first opening facing the light source and a second opening facing the second lens, and an area of the first opening is smaller than that of the second opening;
where, the light polarization component includes:
a transflective component configured to transmit the polarized light polarized in the first polarization direction and reflect at least a part of the polarized light polarized in the second polarization direction.

In some implementations, the light source includes:
a lamp panel;
a light emitting device located on the lamp panel and located on a side, close to the display panel, of the lamp panel; and
a light collector located between the light source and the second lens and configured to converge light emitted by the light emitting device.

In some implementations, the light source further includes a first reflective layer located on the lamp panel, the light emitting device and the first reflective layer are located on a same side of lamp panel, and at least part of an orthographic projection of the first reflective layer on the lamp panel is not overlapped with an orthographic projection of the light emitting device on the lamp panel.

In some implementations, the light collector includes a plano-convex lens, a flat surface of the plano-convex lens faces the light emitting device, and a ratio of a distance from the light emitting device to the plane of the plano-convex lens to a distance from the plane of the plano-convex lens to the second lens ranges from 1:30 to 1:50.

In some implementations, a shape of a light exiting surface of the light emitting device is the same as a shape of a display surface of the display panel.

In some implementations, the light exiting surface of the light emitting device and the display surface of the display panel are both rectangular, a direction in which a long side of the light exiting surface extends is the same as a direction in which a long side of the display surface extends, and a direction in which a short side of the light exiting surface extends is the same as a direction in which a short side of the display surface extends;
a ratio of a length of the light exiting surface to a length of the display surface is 1:a, a ratio of a width of the light exiting surface to a width of the display surface is 1:b, a and b are both larger than 0, and a:b ranges from 0.8:1 to 1.2:1.

In some implementations, a distance from the second lens to the light emitting device is a first distance, and a focal length of the second lens is equal to the first distance; or,
the focal length of the second lens is xmm, and x is an integer closest to a value of the first distance and is divisible by 5.

In some implementations, a divergence angle of light from the light source and a distance from the light source to the second lens satisfy: assuming that the light emitted from the light source is irradiated to a plane where the second lens is located without being obstructed, and a range where the light emitted from the light source is irradiated on the plane where the second lens is located completely covers the second lens.

In some implementations, the divergence angle of light from the light source and the distance from the light source to the second lens satisfy: assuming that the light emitted from the light source is irradiated to the plane where the second lens is coated without being obstructed, a ratio of an area of the second lens to an area of a light spot formed on the plane where the second lens is located ranges from 0.65:1 to 0.75:1.

In some implementations, the transflective component includes an Advanced Polarizer Film (APF).

In some implementations, the light polariztion component further includes a transparent base, the transflective component is located on a side of the transparent base away from the display panel, and a gap exists between the transparent base and the display panel.

In some implementations, the light reflective component includes a polarizer and a reflective mirror, the polarizer is located between the display panel and the reflective mirror and is configured to transmit one of the polarized light polarized in the first polarization direction and the polarized light polarized in the second polarization direction.

In some implementations, the light reflective component includes a plurality of optical film layers integrated together, refractive indexes of any two adjacent optical film layers are different so as to form an optical interface therebetween, each optical interface corresponds to a wave band, and different optical interfaces correspond to different wave bands, each optical interface is configured to transmit the polarized light with a wavelength within a corresponding wave band and polarized in the first polarization direction, and reflect the polarized light with a wavelength within a corresponding wave band and polarized in the second polarization direction, or each optical interface is configured to transmit the polarized light with a wavelength within a corresponding wave band and polarized in the second polarization direction, and reflect the polarized light with a wavelength within a corresponding wave band and polarized in the first polarization direction.

In some implementations, the light reflective component is configured to transmit the polarized light polarized in the first polarization direction and reflect the polarized light polarized in the second polarization direction.

In some implementations, the light polarization component further includes a transparent base, the projection apparatus further includes:

a first antireflective layer, where the transreflective component and the first antireflective layer are respectively arranged on two surfaces of the transparent base opposite to each other; and a second antireflective layer arranged on a surface of the display panel facing the light polarization component.

In some implementations, the projection apparatus further includes a first lens;

the light reflective component includes a polarizer and a reflective mirror, the polarizer is located between the display panel and the reflective mirror, the first lens is located between the polarizer and the reflective mirror and is configured to converge light exited from the polarizer and transmit the converged light to the reflective mirror;

or, the light reflective component includes a plurality of optical film layers integrated together, the first lens is located between the display panel and the light reflective component, and is configured to converge light emitted from the display panel and transmit the converged light to the reflective mirror.

In some implementations, the first lens is a Fresnel lens.

In some implementations, a fourth antireflective layer is provided on a surface of the first lens facing the light reflective component.

In some implementations, a third antireflective layer is provided on a surface of the second lens facing the light source.

In some implementations, a focal length F of the projection lens, an image distance $l_2'$ of the projection lens, and an optical path distance $l_2$ from an intermediate plane to the projection lens satisfy the following formula (1):

$$\frac{1}{l_2'} = \frac{1}{F} + \frac{1}{l_2} \qquad (1)$$

a distance $l_1$ from the first lens to the display panel, a distance from the intermediate surface M1 to the first lens, a focal length f of the first lens satisfy the following formula (2):

$$\frac{1}{l_1'} = \frac{1}{f} + \frac{1}{l_1} \qquad (2)$$

the distance $l_1$ from the first lens to the display panel, the optical path distance $l_2$ from the intermediate plane to the projection lens, and an optical path distance $f_1'$ from the first lens to the projection lens satisfy the following formula (3):

$$l_1 = f_1' - \frac{1}{l_2} \cdot f_1'^2 \qquad (3)$$

where the intermediate plane is a virtual image surface formed by imaging the display panel by the first lens, and the intermediate plane and the display panel are located on a same side of the first lens.

In some implementations, the display panel includes an array substrate, an opposite substrate and a liquid crystal layer located between the array substrate and the opposite substrate;

the array substrate includes a first base substrate, a plurality of gate lines and a plurality of data lines which are arranged on the first base substrate, where the gate lines and the data lines are intersected with each other to define a plurality of pixel regions;

the opposite substrate includes a second base substrate, and a color filter layer and a black matrix arranged on the second base substrate, the color filter layer includes a plurality of light-filtering portions in correspondence with the pixel regions one to one, the black matrix includes a plurality of light blocking bars, orthographic projections of the light blocking bars on the first base substrate cover orthographic projections of the gate lines on the first base substrate, a gap exists between any two adjacent light blocking bars, and the gap exposes a part of each data line.

In some implementations, the display panel includes a plurality of pixel units arranged in an array, each of the pixel units including a red pixel region, a green pixel region, and a blue pixel region, and the green pixel region has an area larger than each of areas of the red pixel region and the blue pixel region.

In some implementations, the area of the green pixel region is 1.05 to 1.1 times the area of the blue pixel region, and the area of the red pixel region is 0.9 to 0.95 times the area of the blue pixel region.

In some implementations, the display panel is in a shape of rectangle and has a first edge and a second edge adjacent to each other, and the first edge extends in a height direction of the projection apparatus;

the light reflective component includes a light incident surface extending along the height direction of the projection apparatus, and the second edge is intersected with the light incident surface of the light reflective component.

In some implementations, the height direction of the projection apparatus is perpendicular to a plane in which an optical axis of an optical system, constituted by the light source component, the light polarization component, the display panel, the light reflective component, and the projection lens, is located.

In some implementations, the projection apparatus further includes a housing and a first fan, and the light polarization component, the display panel, the light reflective component, and at least a portion of the light source component are disposed within the housing;

the projection apparatus further includes a heat dissipating portion which is configured to dissipate heat inside the housing, the first fan includes a first air outlet and a first air inlet, the first air outlet and the first air inlet are located outside the housing, and one of the first air outlet and the first air inlet is arranged facing the heat dissipating portion.

In some implementations, the heat dissipating portion and the housing form a closed space.

In some implementations, the projection apparatus further includes: a second fan including a second air outlet located in the housing, a heat dissipation air duct communicated with the second air outlet is formed in the housing, and the heat dissipation air duct is adjacent to the heat dissipating portion, so that heat in the housing passes by a surface of the heat dissipating portion facing interior of the housing, along with airflow blown out of the second air outlet, to be dissipated out of the housing; where the heat dissipation air duct includes a first channel, a first gap exists between the display panel and the light reflective component, the first gap is the first channel of the heat dissipation air duct, and/or, the heat dissipation air duct includes a second channel, a second gap exists between the display panel and the light source component, and the second gap is the second channel of the heat dissipation air duct.

In some implementations, the projection apparatus includes a light polarization component and a first lens, there is a first gap between the first lens and the display panel, and there is a second gap between the display panel and the light polarization component.

In some implementations, an area of a ventilation cross section of the first channel is 1 to 1.2 times an area of the second air outlet of the second fan;

there is no gap between the second lens and the light polarization component, or a third gap exists between the second lens and the light polarization component, and a width of the third gap is smaller than that of the first gap.

In some implementations, the heat dissipation air duct includes a first channel and a second channel;

the heat dissipation air duct further includes a third channel connecting the first channel with the second channel.

In some implementations, the housing further includes a curved portion corresponding to the third channel, an inner wall of the curved portion is a curved surface, and the curved surface is protruded in a direction away from the first channel and the second channel, so that the airflow of the first channel enters the second channel along the curved surface.

In some implementations, there are a fourth channel and a fifth channel within the housing, the fourth channel is configured to communicate the second air outlet with the first channel; the fifth channel is communicated with the second channel; and the fifth channel is arranged adjacent to the heat dissipating portion and is configured to cool the air in the fifth channel through the heat dissipation portion.

In some implementations, the second fan further includes a second air inlet located in the housing, and the second air outlet, the fourth channel, the first channel, the third channel, the second channel, the fifth channel, and the second air inlet are sequentially connected to form a closed air loop.

In some implementations, the second fan and the heat dissipating portion are both located on a side of at least a portion of the light reflective component away from the projection lens; one of side surfaces of the second fan is arranged in parallel with at least part of the light reflective component; the at least part of the light reflective component is a part or all of the light reflective component which reflect light into the projection lens;

the fourth channel and the fifth channel share at least part of wall and are located on two sides of the at least part of wall.

In some implementations, a material of the heat dissipating portion includes a metal.

In some implementations, at least part of a surface of the heat dissipating portion facing the interior of the housing is a wall of the fifth channel.

In some implementations, a contour of a portion of the heat dissipating portion adjacent to the fifth channel includes a curved surface;

the heat dissipating portion further includes a plurality of first heat dissipation fins extending into the fifth channel, and a direction in which the first heat dissipation fin extending into the fifth channel extends is the same as a direction in which the fifth channel extends.

In some implementations, the heat dissipating portion includes a plurality of second heat dissipation fins arranged in sequence between the first fan and the fifth channel;

the first air outlet of the first fan is arranged facing the heat dissipating portion, an upwind surface is formed at a side, close to the first fan, of the second heat dissipation fins, and the upwind surface and an air outlet surface of the first fan have a same contour; or the first air inlet of the first fan is arranged facing the heat dissipating portion, a leeward surface is formed at a side, close to the first fan, of the second heat dissipation fins, and the leeward surface and an air inlet surface of the first fan have a same contour.

In some implementations, the projection apparatus further includes:

a light source heat dissipator connected with the light source component and configured to dissipate heat of the light source component;

one of the first air inlet and the first air outlet of the first fan is arranged facing the heat dissipating portion, and the other one of the first air inlet and the first air outlet of the first fan is arranged facing the light source heat dissipator.

In some implementations, the light source component includes a light source including a lamp panel and a light emitting element arranged on the lamp panel, the light source heat dissipator includes a heat sink component and a heat conduction connecting element, where the heat sink component is connected with the lamp panel through the heat conduction connecting element.

DRAWINGS

The drawings are intended to provide a further understanding of the present disclosure, constitute a part of the description, and are used to explain the present disclosure together with the following specific embodiments, but do not constitute a limitation of the present disclosure.

DETAILED DESCRIPTION

The specific embodiments of the present disclosure will be described in detail below in combination with the accompanying drawings. It should be understood that the specific embodiments described herein are only for the purpose of explaining and interpreting the present disclosure and are not intended to limit the present disclosure.

To make the objects, technical solutions and advantages of the embodiments of the present disclosure more apparent, the technical solutions of the embodiments of the present disclosure will be clearly and completely described below with reference to the drawings of the embodiments of the present disclosure. It is to be understood that the described embodiments are only a few embodiments of the present disclosure, and not all embodiments. All other embodiments, which can be derived by a person skilled in the art from the described embodiments of the present disclosure without creative effort, fall within the protection scope of the present disclosure.

The terminology used herein to describe embodiments of the present disclosure is not intended to limit and/or define the scope of the present disclosure. For example, unless otherwise defined, technical or scientific terms used herein shall have the ordinary meaning as understood by one of ordinary skill in the art to which the present disclosure belongs. It should be understood that the terms "first," "second," and the like, as used in this disclosure, do not denote any order, quantity, or importance, but rather are used to distinguish one element from another. The singular forms "a," "an," or "the" and similar referents do not denote a limitation of quantity, but rather denote the presence of at least one, unless the context clearly dictates otherwise. The word "comprise/comprising" or "include/including", and the like, means that the element or item appearing in front of the word "comprising" or "comprises" includes the element or item listed after the word "comprise/comprising" or "include/including" and its equivalents, and does not exclude other elements or items. The terms "connected" or "coupled" and the like are not restricted to physical or mechanical connections, but may include electrical connections, whether direct or indirect. The words "upper/on", "lower/under", "left", "right", and the like are used merely to indicate relative positional relationships, which may change accordingly when the absolute position of the object being described changes.

Figure 1:
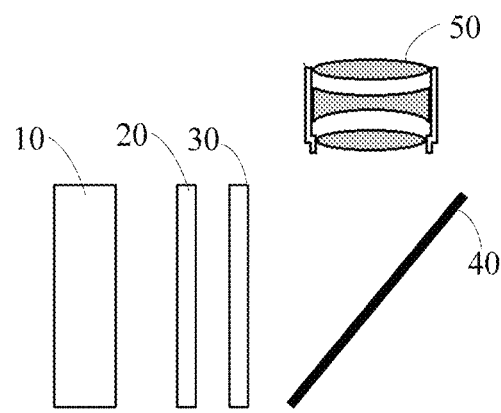
FIG. 1 is a schematic diagram of a projection apparatus provided in some embodiments of the present disclosure.

FIG. 1 is a schematic diagram of a projection apparatus provided in some implementations of the present disclosure, as shown in FIG. 1, the projection apparatus includes a light source component 10, a light polarization component 20, a display panel 30, a light reflective component 40, and a projection lens 50.

The light polarization component 20 is disposed at a light exiting side of the light source component 10, and is configured to convert light emitted by the light source component 10 into first polarized light polarized in a first polarization direction. The light emitted by the light source component 10 may be natural light.

In the present disclosure, the natural light refers to light that does not exhibit any polarization characteristic. Specifically, the natural light emitted by the light source component 10 may be white light.

The display panel 30 is disposed on a side of the light polarization component 20 away from the light source component 10, and is configured to adjust a polarization direction in which the first polarized light is polarized so as to emit a second polarized light. A polarization direction in which the second polarized light is polarized is between the first polarization direction and a second polarization direction, and the first polarization direction is perpendicular to the second polarization direction. It should be noted that the display panel 30 may include a plurality of pixel regions, and each pixel region may adjust the polarization direction in which the first polarized light is polarized, so as to obtain the second polarized light polarized in the polarization direction between the first polarization direction and the second polarization direction. It should be noted that "between the first polarization direction and the second polarization direction" includes two critical directions, i.e., the first polarization direction and the second polarization direction. That is, the polarization direction in which the second polarized light is polarized may be the first polarization direction, may be the second polarization direction, or may be a direction between the first polarization direction and the second polarization direction and intersecting both the first polarization direction and the second polarization direction.

The display panel 30 may be a liquid crystal display panel, and specifically includes an array substrate and an opposite substrate which are oppositely arranged, and a liquid crystal layer located between the array substrate and the opposite substrate. In an example, the array substrate includes: a first base substrate, a plurality of gate lines and a plurality of data lines, where the gate lines and the data lines are arranged on the first base substrate, the gate lines are intersected with the data lines so as to define a plurality of pixel regions, and each pixel region is provided with a pixel electrode. The opposite substrate includes a second base substrate and a common electrode arranged on the second base substrate. A pixel voltage is applied to the pixel electrode and a common voltage is applied to the common electrode, so that an electric field is generated between the pixel electrode and the common electrode to drive liquid crystals in the pixel region to deflect, so as to adjust the polarization direction in which the first polarized light is polarized.

Note that, the polarization direction, in which the second polarized light emitted from any pixel region is polarized, is not necessarily fixed, for example, when the projection apparatus projects different images, the second polarized light may have different polarization directions. It should be noted that, in the embodiments of the present disclosure, the liquid crystal display panel is not limited to a specific type, and for example, the liquid crystal display panel may be a Vertical Alignment (VA) type display panel or a Twisted Nematic (TN) type display panel, in such cases, the common electrode is disposed on the second base substrate. Certainly, the liquid crystal display panel may also be an In Plane Switching (IPS) display panel, a Fringe Field Switching (FFS) display panel, or an Advanced Super Dimension Switching (ADS) display panel, and in such cases, the common electrode is provided on the first base substrate, so long as the electric field is generated between the pixel electrode and the common electrode to drive the liquid crystals to deflect.

The light reflective component 40 is disposed on a side of the display panel 30 away from the light polarization component 20, and is configured to reflect one of the polarized light polarized in the first polarization direction and the polarized light polarized in the second polarization direction.

A light incident surface of the projection lens 50 faces the light reflective component 40 to receive the light reflected by the light reflective component 40 and transmit the received light to a surface of a target object (e.g., a projection screen) to implement projection display.

The principle of projection display of the projection apparatus shown in FIG. 1 will be described below by taking an example in which the light reflective component 40 is configured to reflect the polarized light polarized in the second polarization direction.

After passing through the light polarization component 20, the light emitted by the light source component 10 becomes the first polarized light polarized in the first polarization direction, and the first polarized light irradiates to the display panel 30. In a case where a white image is desired to be displayed, the voltage applied to each pixel region in the display panel 30 may be controlled, so that the liquid crystals in each pixel region adjust the polarization direction in which the first polarized light is polarized to generate the polarized light polarized in the second polarization direction, and the polarized light polarized in the second polarization direction is irradiated to the light reflective component 40 and reflected to the projection lens 50 by the light reflective component 40, so as to display the white image. In a case where a black image is desired to be displayed, the voltage applied to each pixel region in the display panel 30 may be controlled, so that the liquid crystals in each pixel region still transmit the polarized light polarized in the first polarization direction without changing the polarization direction in which the first polarized light is polarized, and the polarized light polarized in the first polarization direction is transmitted through the light reflective component 40, and in this case, no light is irradiated to the projection lens 50, thereby displaying the black image. In a case where a gray-scale image (i.e., an image with a brightness lower than that of the white image and higher than that of the black image) is desired to be displayed, the voltage applied to each pixel region in the display panel 30 may be controlled, so that the liquid crystals in each pixel region adjust the polarization direction in which the first polarized light is polarized to generate polarized light polarized in a third polarization direction, and the polarized light polarized in the third polarization direction is irradiated to the light reflective component 40. The third polarization direction intersects both the first polarization direction and the second polarization direction, and the polarized light polarized in the third polarization direction may be decomposed into a first component polarized in the first polarization direction and a second component polarized in the second polarization direction. The second component is reflected to the projection lens 50 by the light reflective component 40, thereby displaying a gray-scale image.

Similarly, when the light reflective component 40 is configured to reflect the polarized light polarized in the first polarization direction, in a case where a white image is desired to be displayed, the voltage applied to each pixel region in the display panel 30 is controlled, so that the liquid crystals in each pixel region do not change the polarization direction in which the first polarized light is polarized, and the polarized light polarized in the first polarization direction is still transmitted, and is irradiated to the light reflective component 40 and reflected to the projection lens 50 by the reflective component 40, thereby displaying the white image. In a case where a black image is desired to be displayed, the voltage applied to each pixel region in the display panel 30 is controlled so that the liquid crystals in each pixel region adjust the polarization direction in which the first polarized light is polarized to generate polarized light polarized in the second polarization direction, and in this case, no light is irradiated to the projection lens 50, thereby displaying the black image. In a case where a gray-scale image is desired to be displayed, the voltage applied to each pixel region in the display panel 30 is controlled, so that the liquid crystals in each pixel region adjust the polarization direction in which the first polarized light is polarized to generate polarized light polarized in a third polarization direction, the polarized light polarized in the third polarization direction may be decomposed into a first component polarized in the first polarization direction and a second component polarized in the second polarization direction, and the first component is reflected to the projection lens 50 by the light reflective component 40, thereby displaying the gray-scale image.

In the embodiments of the present disclosure, the light reflective component 40 may be designed to reflect the polarized light polarized in the second polarization direction in the light emitted from the display panel 30, or reflect the polarized light polarized in the first polarization direction in the light emitted from the display panel 30, so as to reflect the light with different brightnesses to the projection lens 50, thereby displaying images with different brightnesses. It will be appreciated that whether the light reflective component 40 is designed to reflect the polarized light polarized in the first polarization direction or the polarized light polarized in the second polarization direction depends on the particular type of the display panel. For example, when the display panel is of an ADS, IPS, VA, or TN (in normally white) type, the light reflective component may be designed to reflect the polarized light polarized in the second polarization direction; when the display panel is of a TN (in normally black)

type, the light reflective component may be designed to reflect the first polarized light polarized in the first polarization direction.

It will be appreciated that the light reflective component 40 is configured to change the direction in which the light propogates, which can advantageously reduce the volume of the projection apparatus.

Figure 2:
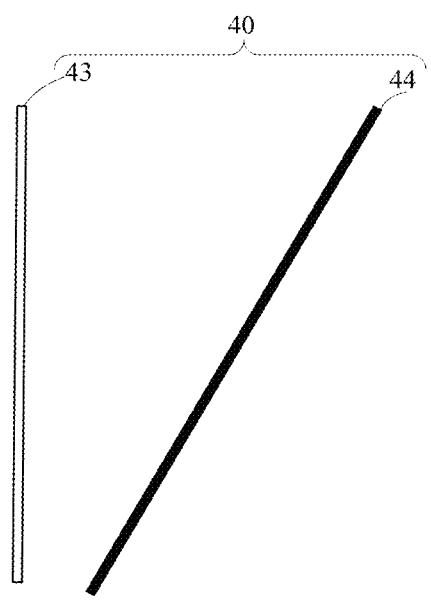
FIG. 2 is a schematic diagram of a film structure of a light reflective component provided in some embodiments of the present disclosure.

FIG. 2 is a schematic diagram of a film structure of a light reflective component provided in some embodiments of the present disclosure, and as shown in FIG. 2, in some implementations, the light reflective component 40 may include: a polarizer 43 and a reflective mirror 44, the polarizer 43 is located between the display panel 30 and the reflective mirror 44. The polarizer 43 is configured to transmit one of the polarized light polarized in the first polarization direction and the polarized light polarized in the second polarization direction, and may absorb the other of the polarized light polarized in the first polarization direction and the polarized light polarized in the second polarization direction. The polarizer 43 may be attached on a surface of the display panel 30.

The projection apparatus may further include a housing, and the above-mentioned structures such as the light polarization component 20, the display panel 30, and the light reflective component 40 may be disposed in the housing, thus a compact structure is formed in the housing, which easily causes heat accumulation in the housing. Moreover, when the polarizer 43 is attached to the display panel 30, the polarizer 43 may absorb light to generate relatively high heat, which may cause adverse effects on the display panel 30, and therefore, in order to ensure normal operation of the display panel, a gap may be formed on at least one side of the display panel 30, so as to facilitate the heat dissipation of the display panel 30.

Figure 3:
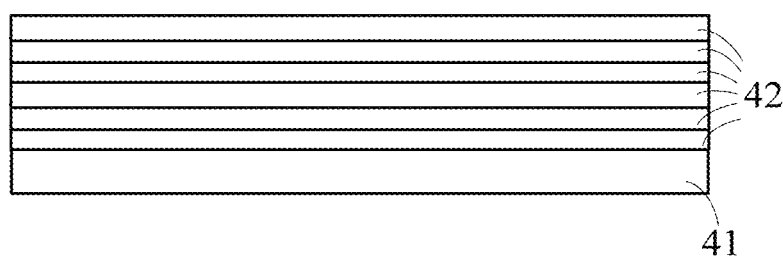
FIG. 3 is a schematic diagram of a film structure of a light reflective component provided in some embodiments of the present disclosure.

In other embodiments, the light reflective component 40 may be configured to reflect one of the polarized light polarized in the first polarization direction and the polarized light polarized in the second polarization direction and transmit the other of the polarized light polarized in the first polarization direction and the polarized light polarized in the second polarization direction. Similarly, whether the light reflective component 40 is designed to reflect the polarized light polarized in the first polarization direction or the polarized light polarized in the second polarization direction depends on the specific type of display panel. FIG. 3 is a schematic diagram of a film structure of a light reflective component provided in other embodiments of the present disclosure, and as shown in FIG. 3, in other embodiments, the light reflective component 40 may include a plurality of optical film layers 42, which are integrated together, disposed on a side of a base substrate 41 (e.g., a glass substrate) facing the display panel 30 and inclined to the display panel 30. Refractive indexes of any two adjacent optical film layers 42 are different, so that an optical interface is formed therebetween. Each optical interface corresponds to one wave band, different optical interfaces correspond to different wave bands, and each optical interface is configured to transmit the polarized light with a wavelength within a corresponding wave band and polarized in the first polarization direction, and to reflect the polarized light with a wavelength within a corresponding wave band and polarized in the second polarization direction. The number of the optical film layers 42 may be three, four, five, or more. For example, there are three optical interfaces between the plurality of optical film layers 42, where a first optical interface is configured to transmit light in a red light band and polarized in the first polarization direction, and reflect light in the red light band and polarized in the second polarization direction; a second optical interface is configured to transmit light in a green light band and polarized in the first polarization direction and reflect light in the green light band and polarized in the second polarization direction; a third optical interface is configured to transmit light in a blue light band and polarized in the first polarization direction and reflect light in the blue light band and polarized in the second polarization direction.

The interfaces between the plurality of optical film layers 42 allow the polarized light polarized in the first polarization direction in the natural light to pass therethrough and reflect the polarized light polarized in the second polarization direction in the natural light. Certainly, the refractive indexes of the optical film layers 42 may also be adjusted such that each optical interface in the light reflective component 40 can transmit the polarized light with a wavelength within a corresponding wave band and polarized in the second polarization direction, and reflect the polarized light with a wavelength within a corresponding wave band and polarized in the first polarization direction.

The light reflective component 40 transmits the light that is not to be reflected to the projection lens 50, which can reduce heat accumulation, thereby facilitating heat dissipation of the projection optical system and further facilitating improvement of display performance of the display panel 30. Moreover, it can be seen from the above projection display principle that if the light reflective component 40 is configured to transmit the polarized light polarized in the second polarization direction and reflect the polarized light polarized in the first polarization direction, then when displaying a white image, the liquid crystal layer does not need to change the polarization direction in which the first polarized light is polarized; and when displaying a black image, the liquid crystals are to be turned over to make the polarization direction, in which the first polarized light is polarized, rotate by 90°, however, in actual driving process, a phenomenon where the liquid crystals cannot be sufficiently turned over easily occurs, thereby leading to light leak to a certain extent when displaying the black image, and then reducing the contrast. Thus, in an example of the present disclosure, the light reflective component 40 is configured to transmit the polarized light polarized in the first polarization direction and reflect the polarized light polarized in the second polarization direction. That is, each optical interface is configured to transmit the polarized light with a wavelength within the corresponding wave band and polarized in the first polarization direction and to reflect the polarized light with a wavelength within a corresponding wave band and polarized in the second polarization direction. In this case, the liquid crystals do not need to be turned over when displaying the black image, thereby avoiding the decrease in contrast as described above.

Figure 4:
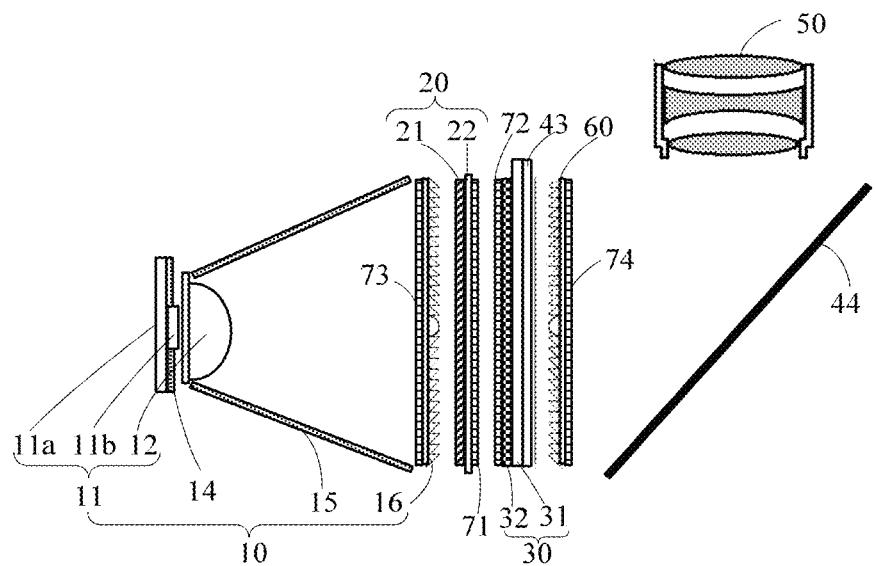
FIG. 4 is a schematic diagram of a projection apparatus provided in some embodiments of the present disclosure.

FIG. 4 is a schematic diagram of a projection apparatus provided in other embodiments of the present disclosure, and as shown in FIG. 4, the projection apparatus includes a light source component 10, a polarization component 20, a display panel 30, a light reflective component 40, and a projection lens 50. In addition, the projection apparatus may further include a first lens 60, where, when the light reflective component 40 includes a polarizer 43 and a reflective mirror 44, the first lens 60 is disposed between the polarizer 43 and the reflective mirror 44, and is configured to converge light exited from the polarizer 43 and irradiate the converged light to the reflective mirror 44. When the light reflective component 40 includes a plurality of optical film layers 42 integrated together, the first lens 60 is disposed on a side of the display panel 30 away from the light source component 10, and is configured to converge the light exited from the display panel 30, and the converged light is reflected into the projection lens 50 by the light reflective component 40 and then is irradiated and projected for imaging.

In some implementations, the light source component 10 is a collimated light source component for emitting collimated light, such that the light source component 10 can irradiate more light to the light polarization component 20, and thus the display panel 30 receives more polarized light polarized in the first polarization direction.

It should be noted that "collimated light" in the embodiments of the present disclosure means that light having a divergence angle less than or equal to 20°. It should be noted that the divergence angle in the embodiments of the present disclosure is twice an included angle between a direction of the light, in the emitted light, farthest from a central axis of the emitted light and the central axis.

In some implementations, the light source component 10 may include a light source 11 and a second lens 16. In some implementations, the light source 11 may specifically include a lamp panel 11a, a light emitting device 11b and a light collector 12 arranged on the lamp panel 11a, where the light emitting device 11b is located on a side of the lamp panel 11a close to the display panel 30. The light emitting device 11b may be an LED lamp.

The light collector 12 is located on a light exiting side of the light emitting device 11b and is configured to converge light emitted from the light emitting device 11b, so as to reduce the divergence angle of the light. In addition, in a case where the light emitting device 11b is an LED lamp, intensity of the light emitted from the light emitting device 11b may be non-uniformly distributed, for example, the intensity of the light close to an axis of the light emitting device 11b is relatively great, and the intensity of the light further away from the axis of the light emitting device 11b is significantly reduced, but the intensity of the light emitted from the light source 11 may be more uniform in an overall by means of the light collector 12. The light collector 12 may be a convex lens, and a surface of the convex lens facing the light source and a surface of the convex lens facing away from the light emitting device 11b may both be convex surfaces, or the surface of the convex lens facing the light emitting device 11b is a plane, and the surface of the convex lens facing away from the light emitting device 11b is a convex surface. In particular, the light collector 12 may be a plano-convex lens.

The second lens 16 is disposed between the light source 11 and the light polarization component 20, and is configured to collimate the light directly irradiated to the second lens 16 from the light source 11. Note that, the light directly irradiated to the second lens 16 from the light source 11 refer to the light emitted from the light source 11 and irradiated to the second lens 16 without being reflected by other elements. In a case where the light source 11 includes the light emitting device 11b and the light collector 12, the light directly irradiated to the second lens 16 from the light source 11 is the light directly irradiated to the second lens 16 from the light collector 12.

Both the first lens 60 and the second lens 16 may be Fresnel lenses. The Fresnel lens can prevent a relatively large spherical aberration and aberration from occurring at the edge of the lens, and the imaging quality is improved. Since the second lens 16 is configured to collimate the divergent light emitted from the light source, and the first lens 60 is configured to converge the light emitted from the display panel 30, when both the first lens 60 and the second lens 16 may be the Fresnel lenses, sawtooth surfaces of the Fresnel lenses face the display panel 30, so that a circular ring or a dark spot may appear on the displayed image.

It is understood that the light collector 12 is configured to converge the light emitted from the light emitting device 11b, but the light collector 12 may not be provided when the light emitting device 11b emits the light with a desired exiting angle. That is, the light emitted from the light emitting device 11b may be directly irradiated to the second lens 16.

In some implementations, the light collector 12 includes a plano-convex lens, a flat surface of the plano-convex lens faces the light emitting device 11b, and a ratio of a distance from the light emitting device 11b to the plane of the plano-convex lens to a distance from the plane of the plano-convex lens to the second lens 16 ranges from 1:30 to 1:50, so that the light efficiency is improved. For example, the ratio of the distance from the light emitting device 11b to the plane of the plano-convex lens to the distance from the plane of the plano-convex lens to the second lens 16 is 1:30, 1:35, 1:40, 1:45, or 1:50. In some implementations, the ratio of the distance from the light emitting device 11b to the plane of the plano-convex lens to the distance from the plane of the plano-convex lens to the second lens 16 is 1:40. As can be seen from simulation tests, when the distance from the light emitting device 11b to the plane of the plano-convex lens ranges from 2 mm to 3 mm and the distance from the plane of the plano-convex lens to the second lens 16 ranges from 80 mm to 120 mm, the light efficiency of the projection apparatus can be improved to the greatest extent. Also, the distance from the light emitting device 11b to the plane of the plano-convex lens can prevent heat of the light emitting device 11b from damaging the plano-convex lens.

It should be noted that, the light exiting surface of the light emitting device 11b is parallel to the plane of the plano-convex lens, and the distance from the light emitting device 11b to the plane of the plano-convex lens is a distance from the light exiting surface of the light emitting device 11b to the plane of the plano-convex lens. In a case where the second lens 16 is the Fresnel lens, the plane of the plano-convex lens is parallel to a plane where the second lens 16 is located, and the distance from the plane of the plano-convex lens to the second lens 16 is a distance from the plane of the plano-convex lens to the plane where the second lens 16 is located.

In some implementations, the light exiting surface of the light emitting device 11b has the same shape as that of a display surface of the display panel 30, thereby improving light efficiency. The shape here refers to a type of shape, for example, the shape of the light exiting surface and the shape of the display surface of the display panel 30 are both rectangular; or both are elliptical; or both are circular; or both are hexagonal, etc.

In some implementations, the light exiting surface of the light emitting device 11b and the display surface of the display panel 30 are both rectangular, and a length direction of the light exiting surface is the same as a length direction of the display surface, and a width direction of the light exiting surface is the same as that of a width direction of the display surface, that is, a long side of the light exiting surface is parallel to a long side of the display surface, and a short side of the light exiting surface is parallel to a short side of the display surface. Certainly, the light exiting surface of the light emitting device 11b and the display surface of the display panel 30 may be both square, and in this case, four sides of the light exiting surface are parallel to four sides of the display surface, respectively.

A ratio of a length of the light exiting surface to a length of the display surface is 1:a, a ratio of a width of the light exiting surface to a width of the display surface is 1:b, a and b are both larger than 0, and a:b ranges from 0.8:1 to 1.2:1, so that occurrence of dark spots in the displayed image can be reduced or avoided. In some implementations, a is equal to b, thereby the occurrence of dark spots is reduced to the most extent and the display effect is improved. In an example, a dimension of the light exiting surface of the light source is equal to 10 mm×10 mm, or 16 mm×11 mm.

In some implementations, the light source component 10 may further include a second reflective layer 15, the second reflective layer 15 is located between the light collector 12 and the first lens 60, and is disposed surrounding an optical axis of the second lens 16, thereby forming a cylindrical structure having a first opening facing the light collector 12 and a second opening facing the second lens 16, and the first opening has an area smaller than that of the second opening. By means of the second reflective layer 15, at least a part of light irradiated to the second reflective layer 15 from the light source 11 can be reflected to the second lens 16, so that the rate that the light is utilized is improved, and the brightness of the displayed image is improved.

In some implementations, the divergence angle of the light source 11 and the distance from the light source 11 to the second lens 16 satisfy a first condition that: assuming that the light emitted from the light source 11 can be irradiated to a plane where the second lens 16 is located without being obstructed, a region that the light emitted from the light source 11 irradiates on the plane where the second lens 16 is located completely covers the second lens 16. Note that the phrase "the light emitted from the light source 11 being irradiated to the plane where the second lens 16 is located without being obstructed" means that the light emitted from the light source 11 is irradiated to the plane where the second lens 16 is located without being reflected by another element. Therefore, it can be ensured that any position of the second lens 16 can receive the light emitted from the light source 11, and dark edge or dark corner can be prevented from occurring at the edge or corner of the projected image. In above implementations (i.e., in a case where the divergence angle of the light source 11 and the distance from the light source 11 to the second lens 16 satisfy the first condition), the specific structure of the light source 11 may include: the lamp panel 11a, the light emitting device 11b and the light collector 12, and the lamp panel 11a may be provided with a first reflective layer 14 thereon. The first reflective layer 14 and the light emitting device 11b are located on a same side of the lamp panel 11a, and at least a portion of the first reflective layer 14 is located outside an area where the light emitting device 11b is located. The provision of the first reflective layer 14 is advantageous for improving the projection brightness, as will be explained in detail below.

In some implementations, assuming that the light emitted from the light source 11 can be irradiated to the plane where the second lens 16 is located without being obstructed, a light spot is formed on the plane where the second lens 16 is located, and an area of the second lens 16 accounts for 60% to 80% of an area of the light spot. In particular, when too much light is directly irradiated on the second lens 16, it may cause unevenness in brightness at a center and edges of the displayed image; when too little light is directly irradiated on the second lens 16, since the second reflective layer 15 is provided, more light is reflected to the second lens 16 by the second reflective layer 15, and a part of the light passing through the second lens 16 would not become collimated, so that in the case where too little light is directly irradiated on the second lens 16, more non-collimated light is generated, thereby greatly affecting the display effect. In some implementations, when the light emitted from the light source 11 is irradiated to the plane where the second lens 16 is located without being obstructed, the light spot is formed on the plane where the second lens 16 is located, and the area of the second lens 16 accounts for 65% to 75% of the area of the light spot.

It should be noted that, when the second lens 16 is the Fresnel lens, the area of the second lens 16 may be regarded as the area of the plane of the Fresnel lens.

In an example, the distance from the second lens 16 to the light emitting device 11b ranges from 70 mm to 80 mm, for example, may be 70 mm, 73 mm, 75 mm, 77 mm or 80 mm. The distance from the second lens 16 to the light emitting device 11b refers to the distance from the light exiting surface of the light emitting device 11b to the plane where the second lens 16 is located.

In some implementations, the distance from the second lens 16 to the light emitting device 11b is a first distance, and a focal length of the second lens 16 is equal to the first distance, so as to improve the collimation effect, and thus improve the light efficiency of the projection apparatus. In an example, the first distance and the focal length of the second lens 16 are both 73 mm.

In some implementations, the focal length of the second lens 16 is xmm, and for cost reasons, x may be set to be equal to an integer nearest the first distance and divisible by 5.

In some implementations, as shown in FIG. 4, the light polarization component 20 includes a transflective component 21, the transflective component 21 is configured to transmit at least the polarized light polarized in the first polarization direction and to reflect at least a part of the polarized light polarized in other polarization directions. In an example of the present disclosure, the transflective component 21 may include an Advanced Polarizer Film (APF).

In some implementations, the light polarization component 20 may further include a transparent base 22, and there is a gap between the transparent base 22 and the display panel 30 for air to flow. The transflective component 21 is disposed on a side of the transparent base 22 away from the display panel 30, such that the light emitted from the light source 10 passes through the transflective component 21 firstly and then is irradiated to the light polarization component 20, thereby improving the effect of the light polarization component 20 modulating the light. Specifically, the transflective component 21 may be secured to a surface of the transparent base 22 by means of an adhesive. The transparent base 22 may be a glass substrate.

When the light emitted by light source component 10 passes through the light polarization component 20, the light vibrating in the first polarization direction passes through the transflective component 21, and at least part of the light vibrating in other directions is reflected by the transflective component 21, thus the heat accumulation on the light polarization component 20 can be reduced to prevent the heat from causing influence on the display panel 30.

In addition, in the case where the projection apparatus includes the transflective component 21, the second lens 16, and the second reflective layer 15, and the second lens 16 is the Fresnel lens, the light emitted from the light source component 10 passes through the second lens 16 to generate collimated light, and the collimated light is irradiated to the transflective component 21. A part of the light irradiated to the transflective component 21 completely transmits through the transflective component 21, another part of the light (including the light polarized in a polarization direction perpendicular to the polarization direction in which the part of the light transmitting through the transflective component 21 is polarized) is reflected by the transflective component 21 to the second lens 16, and the second lens 16 has a depolarization effect on the light (the Fresnel lens has a depolarization effect on the light due to following reasons: the Fresnel lens is formed by pressure injection, and has non-uniform internal stress, which easily causes non-uniform refractive indexes inside the Fresnel lens, thereby causing multiple refractions of light inside the Fresnel lens, so that the polarized light polarized in a single polarization direction is converted into light polarized in respective polarization directions). A part of the light subjected to the depolarization is reflected by the second reflective layer 15 and then is emitted after being transmitted through the second lens 16, which can improve the rate that the light is utilized and thus improve the projection brightness.

In some implementations, as shown in FIG. 4, the lamp panel 11a may be provided with a first reflective layer 14 thereon, the first reflective layer 14 and the light emitting device 11b are located on a same side of the lamp panel 11a, and at least a portion of the first reflective layer 14 is located outside the area where the light emitting device 11b is located.

In a case where the projection apparatus includes the transflective component 21, the second lens 16 and the first reflective layer 14, and the second lens 16 is the Fresnel lens, light emitted from the light source component 10 passes through the second lens 16 to generate collimated light, and the collimated light is irradiated to the transflective component 21. A part of the light irradiated to the transflective component 21 is completely transmitted through the transflective component 21, and another part of the light (including the light polarized in a polarization direction perpendicular to the polarization direction in which the part of the light transmitting through the transflective component 21 is polarized) is reflected by the transflective component 21 to the second lens 16. The second lens 16 is to depolarize the light, so that the polarized light, polarized in a single polarization direction and reflected to the second lens 16, becomes light having components polarized in respective polarization directions. A part of the light subjected to the depolarization is irradiated to the first reflective layer 14, is reflected to the second lens 16 by the first reflective layer 14, and is transmitted through the second lens 16 to be emitted, so that the rate that the light is utilized can be improved, and the projection brightness is further improved.

Figure 5:
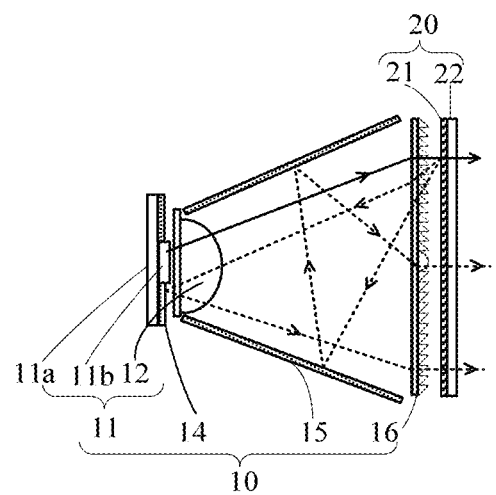
FIG. 5 is an optical path diagram of an illumination module provided in some embodiments of the present disclosure.

FIG. 5 is an optical path diagram of an illumination module provided in some embodiments of the present disclosure, where the illumination module includes a light source component 10 and a light polarization component 20. The light source component 10 includes a light source 11 and a second reflective layer 15. The light source 11 includes a lamp panel 11a, a light emitting device 11b and a light collector 12, and the lamp panel 11a is provided with a first reflective layer 14 thereon. The light polarization component 20 includes a transflective component 21. As shown in FIG. 5, the light emitted from the light emitting device 11b is irradiated to the light collector 12, the light collector 12 converges the light (for example, converges the light with a divergence angle of 160° into the light with a divergence angle of less than 60°), the converged light is irradiated to the second lens 16, the second lens 16 collimates the light, and the collimated light is irradiated to the light polarization component 20. A part of the light irradiated to the light polarization component 20 is completely transmitted through the polarizer component 20, as shown by the solid arrows in FIG. 5; and another part of the light irradiated to the light polarization component 20 is reflected by the light polarization component 20 to the second lens 16, as shown by the dotted arrows in FIG. 5. In a case where the second lens 16 is the Fresnel lens, it has a depolarization effect on light, so that the polarized light, which is polarized in a single polarization direction and is reflected to the second lens 16, becomes light having components polarized in respective polarization directions. A first part of the light subjected to the depolarization is exited from the second lens 16 after being reflected multiply by the second reflective layer 15; a second part of the light subjected to the depolarization is reflected to the second lens 16 by the first reflective layer 14, and is exited from the second lens 16. It can be seen that the provision of the first reflective layer 14 and the second reflective layer 15 can improve the light efficiency of the illumination module. It is verified that the projection brightness of the projection apparatus provided with the first reflective layer 14 and the second reflective layer 15 in FIG. 4 can be raised by 4.5%, compared with the projection apparatus not provided with first reflective layer 14 and the second reflective layer 15 (and other structures of the projection apparatus are the same as those in FIG. 4). Compared with the projection apparatus in which the first reflective layer 14 and the second reflective layer 15 are not provided and the light polarization component 20 has no reflection function (and other structures of the projection apparatus are the same as those in FIG. 4), the projection brightness of the projection apparatus provided with the first reflective layer 14, the second reflective layer 15 and the transflective component 21 in FIG. 4 can be raised by 21.36%.

In addition, it is verified that the projection brightness of the projection apparatus provided with the light collector 12 shown in FIG. 4 can be raised by 30%, compared with the projection apparatus not provided with the light collector 12 (other structures of the projection apparatus are the same as those in FIG. 4). The reason is that: the light emitted from the light emitting device 11b has a relatively large divergence angle, and in the case where the light collector 12 is not provided, most of the light is irradiated to the second reflective layer 15, and a part of the light reflected by the second reflective layer 15 may not be collimated by the second lens 16, resulting in low projection brightness. By providing the light collector 12, by converging through the light collector 12, little light emitted by the light source 11 is irradiated to the second reflective layer 15, so that more collimated light is exited from the second lens 16, thereby improving the projection brightness of the projection apparatus. It can be understood that the combination of the light emitting device 11b and the light collector 12 may also be replaced by a light source with a relatively small divergence angle, for example, when the light emitted from the light source 11 is irradiated to a plane where the second lens 16 is located without being obstructed, the amount of light directly irradiated on the second lens 16 accounts for 60% to 80% of the total amount of light emitted from the light source 11. In some implementations, when the light emitted from the light source 11 is irradiated to the plane where the second lens 16 is located without being obstructed, the amount of light directly irradiated on the second lens 16 accounts for 65% to 75% of the amount of light emitted from the light source 11. In some implementations, the light emitting device 11b emits light uniformly at different angles.

In some implementations, as shown in FIG. 4, the transflective component 21 is disposed on a surface of the transparent base 22, and the transparent base 22 may serve as a support for the transflective component 21. The transparent base 22 may be a glass base. In view of the fact that the transparent base 22 has a certain reflection effect on light, especially when the transparent base 22 is the glass base, the reflection effect is more obvious than that of a base made of an organic material, and therefore, in the projection apparatus according to the embodiments of the present disclosure, a plurality of antireflective layers are provided, the antireflective layers include a first antireflective layer 71 disposed on a surface of the transparent base 22 away from the light polarization component 20, so that more light can be irradiated to the display panel 30, thereby improving the projection brightness of the projection apparatus. In addition, the antireflective layers may be formed by a coating method, and the transparent base 22 can prevent the high temperature during coating from damaging the film structure of the transflective component 21.

Figure 6A:
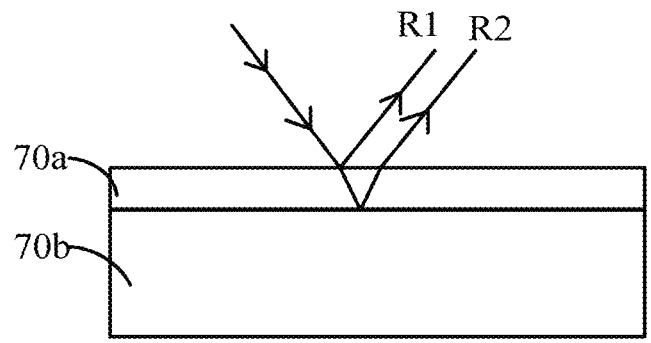
FIG. 6A is a schematic diagram illustrating antireflection of light by an antireflective layer.
Figure 6B:
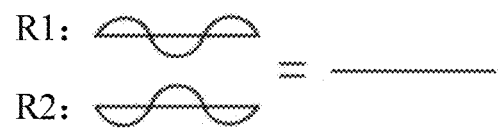
FIG. 6B is a waveform diagram of the reflected light in FIG. 6A.

FIG. 6A is a schematic diagram illustrating antireflection of light by the antireflective layer, as shown in FIG. 6A, the antireflective layer includes a first sub-film layer 70a and a second sub-film layer 70b, when the light is irradiated to the antireflective layer, the light is refracted and reflected on a surface of the first sub-film layer 70a away from the second sub-film layer 70b, and the reflected light is denoted by R1 in FIG. 6A. The refracted light is reflected and refracted at an interface between the first sub-film layer 70a and the second sub-film layer 70b, and the reflected light is denoted by R2 in FIG. 6A. FIG. 6B is a waveform diagram of the reflected light in FIG. 6A, as shown in FIG. 6A and FIG. 6B, the antireflective layer is a film layer utilizing light's equal thickness interference principle, and a thickness of the first sub-film layer 70a is set such that destructive interference occurs between the reflected light R1 and R2, so as to reduce the overall light reflection capability of the antireflective layer and increase the light transmittance of the antireflective layer.

In some implementations, the display panel 30 is a liquid crystal display panel, and a base substrate of the display panel 30 close to the light source component 10 may include a glass substrate to ensure structural stability of the display panel 30. In order to alleviate or prevent the light from being reflected on the surface of the display panel 30 facing the light source component 10, as shown in FIG. 4, the antireflective layers further include a second antireflective layer 72 disposed on a surface of the display panel 30 close to the light polarization component 20, and the second antireflective layer can alleviate the reflection of the light on the surface of the display panel 30, so that more light is incident into the display panel 30.

In some implementations, as shown in FIG. 4, the antireflective layers further include a third antireflective layer 73 and a fourth antireflective layer 74, and the third antireflective layer 73 is disposed on a surface of the second lens 16 facing the light collector 12 to allow more light to transmit through the second lens 16 and irradiate to the light polarization component 20. The fourth antireflection coating 74 is disposed on a surface of the first lens 60 facing the light reflective component 40 to allow more light to transmit through the first lens 60 and irradiate to the reflector component 40.

It should be noted that the projection apparatus may be provided with the first antireflective layer 71 to the fourth antireflective layer 74 simultaneously, or may be provided with part of the first antireflective layer 71 to the fourth antireflective layer 74, for example, only the first antireflective layer 71 and the second antireflective layer 72 may be provided. In some implementations, the first antireflective layer 71 to the fourth antireflective layer 74 are provided in the projection apparatus simultaneously, so that light is irradiated to the projection lens 50 as much as possible when a white image is displayed, thereby improving the light efficiency of the projection apparatus. Tests show that, the light efficiency of the projection apparatus, simultaneously provided with the first antireflective layer 71 to the fourth antireflective layer 74, is raised by 8.2%, compared with the light efficiency of the projection apparatus in which no antireflective layer is provided.

In the embodiments of the present disclosure, as described above, the display panel 30 may be a liquid crystal display panel, and include the array substrate 31, the opposite substrate 32 and the liquid crystal layer between the array substrate 31 and the opposite substrate 32, as shown in FIG. 4, and the opposite substrate 32 may be located at a side of the array substrate 31 close to the light source component 10. The array substrate 31 includes a first base substrate, a plurality of gate lines and a plurality of data lines arranged on the first base substrate, and the plurality of gate lines intersect with the plurality of data lines to define a plurality of pixel regions. The opposite substrate 32 includes a color filter layer including a plurality of light-filtering portions, in addition to the second base substrate and the common electrode, and the light-filtering portions are disposed in correspondence with the pixel regions one to one. The plurality of pixel regions may include a plurality of red pixel regions, a plurality of green pixel regions, and a plurality of blue pixel regions, a color of the pixel region is the color of the light-filtering portion corresponding to the pixel region, for example, the color of the light-filtering portion corresponding to the red pixel region is red, the color of the light-filtering portion corresponding to the blue pixel region is blue, and the color of the light-filtering portion corresponding to the green pixel region is green.

Figure 7:
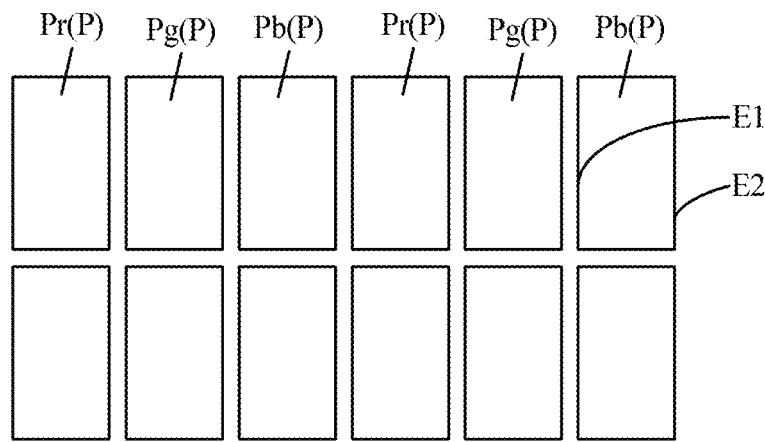
FIG. 7 is a schematic diagram illustrating a distribution of pixel regions of a display panel provided in some embodiments of the present disclosure.

FIG. 7 is a schematic diagram illustrating a distribution of pixel regions of a display panel provided in some embodiments of the present disclosure, and as shown in FIG. 7, the pixel regions P of the display panel 30 may be arranged in a plurality of rows, each row includes a plurality of pixel regions P, each pixel region is substantially in a rectangular shape, and a length direction of each pixel region extends along a column direction. That is, every pixel region P has a first side and a second side opposite to each other, and the first side and the second side are arranged side by side in a row direction, the first side and the second side each extend in the column direction, in this way, an area of each pixel region P can be increased under a condition that an area of the display area is limited and the number of the pixel regions P is limited, therefore, the transmittance of the display panel 30 can be improved.

In some implementations, the plurality of pixel regions P of the display panel 30 may constitute a plurality of pixel units arranged in an array, and each pixel unit may include a green pixel region Pg, a red pixel region Pr and a blue pixel region Pb, where an area of the green pixel region Pg is larger than an area of each of the red pixel region Pr and the blue pixel region Pb. Since the color of green is a main factor affecting the brightness of the pixel unit, compared with a case where areas of the pixel regions P of different colors are the same, increasing the area of the green pixel region Pg is beneficial to improving the brightness of the display panel 30.

It can be understood that, in a case where an area of the pixel unit is fixed, if the area of the green pixel region Pg is increased, a total area of the red pixel region Pr and the blue pixel region Pb is to be reduced, and since the color of blue has a relatively great influence on an overall color of the pixel unit, in some implementations, the total area of the red pixel region Pr and the blue pixel region Pb may be reduced by reducing the area of the red pixel region Pr, so as to improve the brightness of the pixel unit and reduce the influence on the color of the pixel unit. In this case, the area of the blue pixel region Pb is smaller than that of the green pixel region Pg and larger than that of the red pixel region Pr.

In some implementations, a ratio of the area of the green pixel region Pg to the area of the blue pixel region Pb ranges from 1.05:1 to 1.1:1, and a ratio of the area of the red pixel region Pr to the area of the blue pixel region Pb ranges from 0.9:1 to 0.95:1. In some implementations, a ratio of the area of the red pixel region Pr to that of the green pixel region Pg and to that of the blue pixel region Pb is 0.93:1.07:1, so that the transmittance can be raised by 3.2% and the influence on the color temperature is relatively small (with such design, the color temperature is reduced by 400K).

Figure 8:
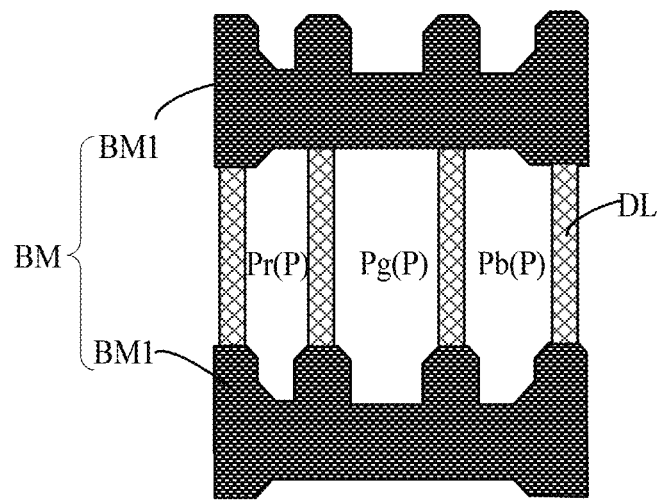
FIG. 8 is a plan view of a black matrix provided in some embodiments of the present disclosure.

In some implementations, the opposite substrate 32 further includes a black matrix disposed on the second base substrate, FIG. 8 is a plan view of the black matrix provided in the embodiments of the present disclosure, as shown in FIG. 8, the black matrix BM includes a plurality of light-blocking bars BM1, and in some implementations, the light-blocking bars BM1 each may extend in the row direction. Orthographic projections of the light-blocking bars BM1 on the first base substrate cover orthographic projections of the gate lines on the first base substrate, and a space exists between any two adjacent light-blocking bars BM1, and the space exposes a part of each data line DL.

In the projection apparatus, the light emitted from the display panel 30 passes through the light reflective component 40 and the projection lens 50, and is then projected and imaged on the target object. That is, the light of each pixel region viewed by human eyes is nearly vertically emitted form the pixel region, and therefore, the crosstalk between the pixel units in the same row is less. Due to the arrangement of the light-blocking bars, the crosstalk may not occur between different pixel units in the same column, and therefore, the black matrix BM with the above mentioned structure in the embodiments of the disclosure can improve the transmittance of the display panel 30 while ensuring the display effect. It has been verified that the transmittance of the display panel 30 can be raised by 16.7% by using the black matrix BM having the above mentioned structure, compared with using a black matrix having a grid shape (i.e., the black matrix covers the gate lines and the data lines).

Figure 9:
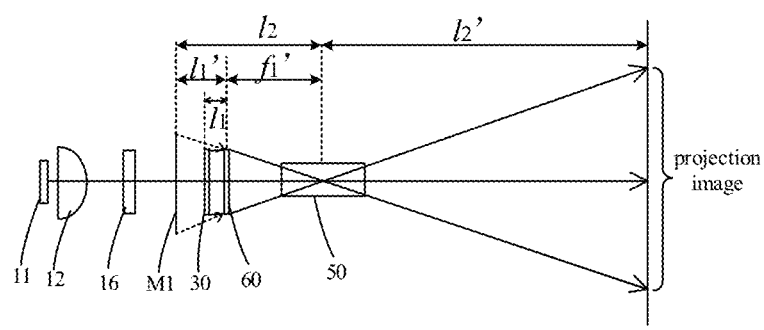
FIG. 9 is a schematic diagram illustrating a stack of some elements in a projection apparatus provided in some embodiments of the present disclosure.

FIG. 9 is a schematic diagram illustrating a stack of some elements in the projection apparatus provided in some implementations of the present disclosure, and as shown in FIG. 9, the display panel 30 is located within a focal length of the first lens 60, in such case, a virtual image formed by imaging the display panel 30 by the first lens 60 is located on an intermediate plane M1, the intermediate plane M1 and the display panel 30 are located on a same side of the first lens 60, an optical path distance from the intermediate plane M1 to the projection lens 50 is $l_2$, a projection distance of the projection lens 50 (i.e., an image distance of the projection lens 50) is $l_2'$, a focal length of the projection lens 50 is F, a distance from the first lens 60 to the display panel 30 is $l_1$, and a distance from the intermediate plane M1 to the first lens 60 is $l_1'$. When designing an actual product of the projection apparatus, the focal length F of the projection lens may be determined according to a desired projection distance, a desired size of a projection image to be displayed, and a dimension of the display area of the display panel 30 to The focal length F is equal to $$\frac{\text{the projection distance } l_2' * \text{the dimension of the display area}}{\text{the dimension of the projection image}}.$$

After the focal length
F of the projection lens 50 is determined, an object distance of the projection lens 50 (i.e., the above $l_2$) may be determined according to the lens maker's equation of the projection lens 50 (i.e., the following formula 1-1):

$$\frac{1}{l_2'} = \frac{1}{F} + \frac{1}{l_2}, \qquad \text{formula 1-1}$$

then, according to the focal length of the first lens 60 and an object-image relationship between the projection lens 50 and the first lens 60, a formula 1-3 can be derived according to the above formula 1-1 and the following formula 1-2, where the formula 1-2 is the lens maker's equation of the first lens 60, and f is the focal length of the first lens 60, and $f_1'$ is an optical path distance from the first lens to the projection lens.

$$\frac{1}{l_1'} = \frac{1}{f} + \frac{1}{l_1} \qquad \text{formula 1-2}$$

$$l_1 = f_1' - \frac{1}{l_2} \cdot f_1'^2 \qquad \text{formula 1-3}$$

The focal length of the first lens 60, the optical path distance from the first lens 60 to the projection lens 50, and the distance from the first lens 60 to the display panel 30 can be specified according to the above three formulas.

It should be noted that, the optical path distance from an optical device to the projection lens 50 refers to a path length that the light emitted from a center of the optical device pass through when the light is reflected to a center of the projection lens 50 by the light reflective component. It should be further noted that, the first lens 60 is parallel to the display panel 30, and the distance from the first lens 60 to the display panel 30 refers to a distance from a plane where the first lens 60 is located to the light exiting surface of the display panel 30; the intermediate plane M1 is parallel to the first lens 60, and the distance from the intermediate plane M1 to the first lens 60 refers to a distance from the intermediate plane M1 to the plane where the first lens 60 is located.

Figure 10:
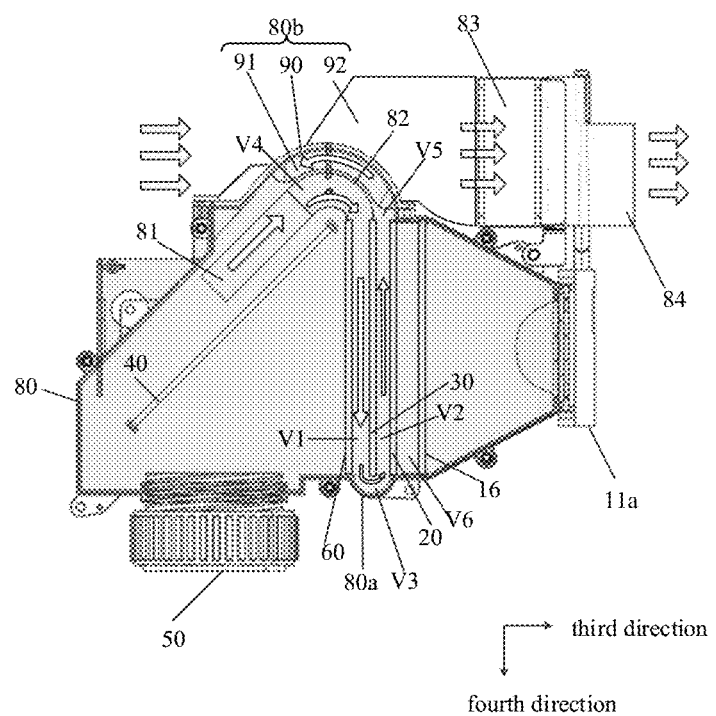
FIG. 10 is an overall structural top view of a projection apparatus provided in some embodiments of the present disclosure.
Figure 11:
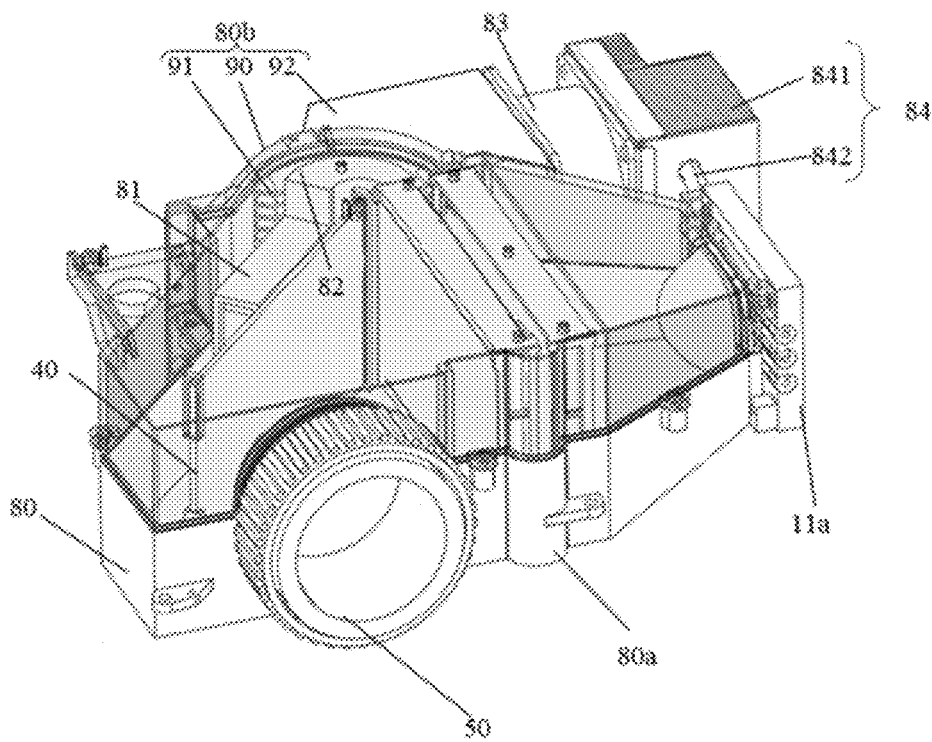
FIG. 11 is an overall structural perspective view of a projection apparatus provided in some embodiments of the present disclosure.

FIG. 10 is an overall structural top view of a projection apparatus provided in some embodiments of the present disclosure, and FIG. 11 is an overall structural perspective view of a projection apparatus provided in some embodiments of the present disclosure, and as shown in FIGS. 10 and 11, the projection apparatus further includes a housing 80, the light polarization component 20, the display panel 30, the light reflective component 40, and the first lens 60 are all disposed in the housing 80, at least a portion of the light source component 10 is disposed in the housing 80, and for example, the light emitting device 11b, the light collector 12, and the second lens 16 are disposed in the housing 80.

The second lens 16, the light polarization component 20, the display panel 30, and the first lens 60 may be disposed on a support within the housing 80. For example, the second lens 16 and the light polarization component 20 may be disposed on a first support, and the display panel 30 and the first lens 60 may be disposed on a second support, both the first support and the second support are fixed on an inner surface of the housing 80.

Figure 12:
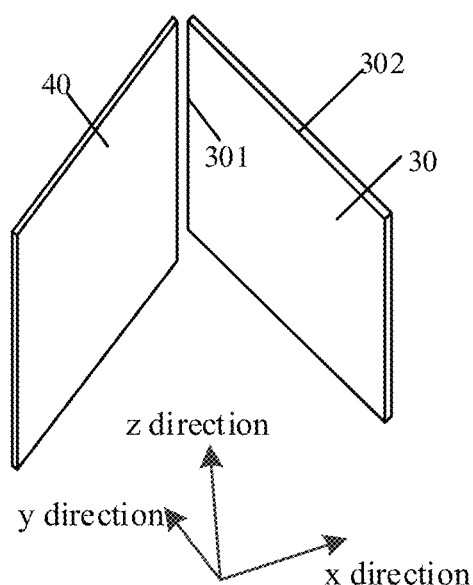
FIG. 12 is a schematic diagram illustrating a position relationship between a display panel and a light reflective component.

In some implementations, the projection apparatus adopts a horizontal structure, specifically, FIG. 12 is a schematic diagram illustrating a position relationship between the display panel and the light reflective component, as shown in FIG. 12, the display panel 30 is rectangular and has a first edge 301 and a second edge 302 adjacent to each other, the first edge 301 has a length smaller than that of the second edge 302, the horizontal structure means that the first edge 301 extends along a height direction of the projection apparatus (i.e., a z direction in FIGS. 11 and 12), the second edge 302 extends along a y direction in FIG. 12, and the light polarization component 20 and the display panel 30 are arranged along an x direction in FIG. 12; the first edge 301 of the display panel 30 is parallel to a plane where the light reflective component 40 is located, and the second edge 302 intersects the plane where the light reflective component 40 is located. Compared with a vertical structure, when the projection apparatus adopts the horizontal structure, the light path distance from the projection lens 50 to the display panel 30 is longer, which is beneficial to improving the luminous flux of the projection apparatus and improving the display effect.

Moreover, the projection apparatus adopting the horizontal structure is beneficial to reducing an overall height of the projection apparatus. In some implementations, a height of the projection apparatus is less than or equal to 80 mm.

It should be noted that, the first edge 301 being parallel to the plane where the light reflective component 40 is located means that an included angle between the first edge 301 and the plane where the light reflective component 40 is located is in a range of [0, 10°].

It should be noted that, the horizontal structure is described above by taking the display panel 30 being rectangular as an example, in some implementations, the display panel 30 may also be non-rectangular, in such case, the horizontal structure is a structure satisfying that: the height direction of the projection apparatus is perpendicular to a plane where an optical axis of an optical system formed by the light source component 10, the light polarization component 20, the display panel 30, the light reflective component 40 and the projection lens 50 is located. It should be noted that, the plane where the optical axis of the optical system is located refers to a plane defined by optical axes of the light source component 10, the light polarization component 20, the display panel 30, the light reflective component 40, and the projection lens 50. For example, referring to FIG. 10, the optical axes of the light source component 10, the light polarization component 20, and the display panel 30 each extend along a third direction, and the optical axis of the projection lens 50 extends along a fourth direction, the plane where the optical axis of the optical system is located is parallel to the third direction and the fourth direction, and the height direction of the projection apparatus is a direction perpendicular to the paper as shown in FIG. 10.

In some implementations, as shown in FIG. 10, the housing 80 may include a heat dissipating portion 80b for dissipating heat inside the housing 80. The heat dissipating portion 80b and the housing 80 may form an enclosed space, and specifically, the housing 80 may include a top wall, a bottom wall and a side wall connect between the top wall and the bottom wall, the side wall may have an opening therein, and the heat dissipating portion 80b covers the opening in the side wall to form the enclosed space together with the side wall, the top wall and the bottom wall.

The projection apparatus further includes a first fan 83 including a first air outlet and a first air inlet, the first air outlet and the first air inlet are located outside the housing 80, and one of the first air outlet and the first air inlet is arranged facing the heat dissipating portion 80b, so that facilitating heat dissipation by the heat dissipating portion 80b. The first fan 83 may be an axial fan, which may have a rated power ranging from 1.5 W to 4 W, for example, may have a power of 2 W.

As shown in FIG. 10, the projection apparatus may further include a second fan 81 including a second air outlet and a second air inlet, and the second air outlet is located in the housing 80. In some implementations, the second fan 81 may be a centrifugal fan, which may have a rated power ranging from 1.5 W to 4 W, for example, may have a power of 2 W.

A heat dissipation air duct communicated with the second air outlet is further formed in the housing 80, and the heat dissipation air duct is adjacent to the heat dissipating portion 80b, so that when airflow is blown out from the second air outlet, the heat in the housing 80 can be diffused to the heat dissipating portion 80b along with the airflow, and then is dissipated out of the housing 80. The heat dissipation air duct includes a first channel V1 and/or a second channel V2. A first gap exists between the display panel 30 and the light reflective component 40, and the first gap is the first channel V1 of the heat dissipation air duct, and a second gap exists between the display panel 30 and the light source component 10, and the second gap is the second channel V2 of the heat dissipation air duct.

It should be noted that the first gap existing between the display panel 30 and the light reflective component 40 means that an air gap exists between the display panel 30 and a portion of the light reflective component 40 farthest away from the display panel 30. In particular, when the light reflective component 40 includes the plurality of optical film layers 42 integrated together, the first gap may be at least a portion of the gap existing between the display panel 30 and the plurality of optical film layers 42; when the light reflective component 40 includes the polarizer 43 and the reflective mirror 44, the first gap may be at least a portion of a gap existing between the display panel 30 and the reflective mirror 44.

As described above, in some implementations, the projection apparatus may further include a light polarization component 20 and a first lens 60, in such case, the first gap may be specifically located between the first lens 60 and the display panel 30, and the second gap may be specifically located between the display panel 30 and the light polarization component 20. In a case where the light polarization component 20 includes a transflective component 21 and a transparent base 22, the second gap may be located between the display panel 30 and the transparent base 22, and the transflective component 21 is not in contact with the second gap. It is understood that when the light emitted from the light source 11 is irradiated to the transflective component 21, a portion of the light may be absorbed by the transflective component 21 to generate a certain amount of heat, and the transparent base 22 may transfer at least a portion of the heat from the transflective component 21 to the second channel V2 for heat dissipation.

With the first channel V1 and the second channel V2, the heat of the display panel 30 can be dissipated from at least one side of the display panel 30, and the heat can be prevented from concentrating on the display panel 30 to affect the performance of the display panel 30.

In some implementations, the heat dissipation air duct may include both the first channel V1 and the second channel V2, so that heat of the display panel 30 may be dissipated from opposite sides of the display panel 30. In addition, as shown in FIG. 10, the heat dissipation air duct further includes a third channel V3 connecting the first channel V1 with the second channel V2. The side wall of the housing 80 further includes a curved portion 80a corresponding to the third channel V3, an inner wall of the curved portion 80a is an arc surface, and the arc surface protrudes in a direction away from the first channel V1 and the second channel V2, so that the airflow in the first channel V1 enters the second channel V2 along the arc surface. It should be noted that, the curved portion 80a "corresponding to" the third channel V3 means that the curved portion 80a is closely adjacent to the third channel V3.

As shown in FIG. 10, the housing 80 further includes a fourth channel V4 and a fifth channel V5, the fourth channel V4 communicates the second air outlet of the second fan 81 with the first channel V1, the fifth channel V5 is communicated with the second channel V2, and the fifth channel V5 is disposed adjacent to the heat dissipating portion 80b, so as to cool the gas in the fifth channel V5 through the heat dissipating portion 80b.

In the present disclosure, the first channel V1, the second channel V2, the third channel V3, the fourth channel V4 and the fifth channel V5 form a continuous channel, and the continuous channel is communicated with the second air inlet and the second air outlet of the second fan 81, so that when the second fan 81 blows air out, an airflow is formed in the continuous channel, and the airflow passes by two sides of the display panel 30, so as to take away heat of the display panel 30, and when the heat passes by the heat dissipating portion 80b, the heat is dissipated to outside by the heat dissipating portion 80b.

In some implementations, the second air inlet of the second fan 81 is located in the housing 80, and the second air outlet of the second fan 81, the fourth channel V4, the first channel V1, the third channel V3, the second channel V2, the fifth channel V5, and the second air inlet of the second fan 81 are connected in sequence to form a closed air loop. That is, the air blown out from the second air outlet of the second fan 81 firstly enters the fourth channel V4, then sequentially passes through the first channel V1, the third channel V3, the second channel V2 and the fifth channel V5, and finally enters the second air inlet of the second fan 81. The arrows in FIG. 10 indicate a direction of the airflow.

In some implementations, an area of a ventilation cross section of the first channel V1 is 1 to 1.2 times of an area of the second air outlet of the second fan 81, so as to facilitate the air blown out from the second fan 81 to enter the first channel V1, and the heat dissipation efficiency is improved. Similarly, an area of the ventilation cross section of the second channel V2 is 1 to 1.2 times of the area of the second air outlet of the second fan 81. The ventilation cross section of the first channel V1 refers to a cross section of the first channel V1 taken along a direction perpendicular to a direction in which the air in the first channel is flowed. The ventilation cross section of the second channel V2 refers to a cross section of the second channel V2 taken along a direction perpendicular to a direction in which the air in the second channel is flowed. The first channel V1 and the second channel V2 both have a length, a width and a height, and the lengths of the first channel V1 and the second channel V2 are dimensions of the first channel V1 and the second channel V2 in a fourth direction in FIG. 10, respectively; the widths of the first channel V1 and the second channel V2 are dimensions of the first channel V1 and the second channel V2 in a third direction in FIG. 10, and the third direction is a thickness direction of the display panel 30; and the heights of the first channel V1 and the second channel V2 are dimensions of the first channel V1 and the second channel V2 in a direction perpendicular to the paper surface in FIG. 10, respectively.

In some implementations, the widths of the first channel V1 and the second channel V2 each range from 6 mm to 10 mm, for example, each of the widths of the first channel V1 and the second channel V2 is 8 mm.

In some implementations, there may be no gap between the second lens 16 and the light polarization component 20, thereby improving the compactness of the projection apparatus.

In some implementations, a third gap V6 exists between the second lens 16 and the light polarization component 20, so as to provide some positioning structures on the housing for positioning the second lens 16 and/or the light polarization component 20.

In a case where the third gap V6 exists between the second lens 16 and the light polarization component 20, in an example, the third gap V6 may not be in communication with the third channel V3. In this case, a width of the third gap V6 is as small as possible, for example, may be smaller than the width of the first gap, so as to improve the compactness of the projection apparatus. For example, the width of the third gap V6 is less than 8 mm, for example, may be 2 mm. The width of the third gap V6 refers to a dimension of the third gap V6 in the thickness direction of the display panel 30. In another example, the third gap V6 may be in communication with the third channel V3 and the fifth channel V5, that is, a part of the airflow in the third channel V3 may enter the second channel V2, and another part of the airflow in the third channel V3 may enter the third gap V6, so that heat of the light polarization component 20 can be dissipated from two sides of the light polarization component 20 to improve the heat dissipation effect from inside of the projection apparatus. In this case, a sum of the areas of the ventilation cross sections of the third gap V6 and the second channel V2 may be the same as the area of the ventilation cross section of the first channel V1, thereby facilitating a smooth flow of the airflow inside the projection apparatus.

Since the light source component 10 is a main heat generating source, and the light polarization component 20 is closer to the light source component 10, the heat in the first channel V1 is less than the heat in the second channel V2, and the first channel V1 being communicated with the first air outlet is equivalent to that the airflow firstly flows through a low-temperature area and then flows through a high-temperature area, so that the heat dissipation of the display panel 30 is more facilitated.

As shown in FIG. 10, the fourth channel V4 and the fifth channel V5 share at least a portion of a channel wall 82 and are disposed on opposite sides of the at least the portion of the channel wall 82.

As shown in FIG. 10, the second fan 81 and the heat dissipating portion 80b are located on a side of at least a portion of the light reflective component away from the projection lens 50, so as to prevent the second fan 81 and the heat dissipating portion 80b from affecting the optical path in the projection apparatus. The second fan 81 may include a plurality of side surfaces, one of which is disposed parallel to at least a portion of the light reflective component, so that the structure inside the housing 80 is more compact, thereby reducing an overall volume of the projection apparatus. For example, the second fan 81 has a cuboid structure, and one of side surfaces of the cuboid structure is disposed parallel to at least a portion of the light reflective component. It should be noted that the "at least a portion of the light reflective component" refers to a portion or an entire of the light reflective component 40 that reflect light into the projection lens 50, and specifically, in a case where the light reflective component 40 include the optical film layers 42 integrated together, the "at least a portion of the light reflective component" refers to the entire light reflective component 40; and in a case where the light reflective component 40 includes the polarizer 43 and the reflective mirror 44, the "at least a portion of the light reflective component" refers to the reflective mirror 44.

As shown in FIG. 10, at least a part of a surface of the heat dissipating portion 80b facing the interior of the housing 80 is a wall of the fifth channel V5. For example, in a case where no other structural member is disposed on the surface of the heat dissipating portion 80b facing the interior of the housing 80, the entire surface of the heat dissipating portion 80b facing the interior of the housing 80 may serve as the wall of the fifth channel V5; in a case where there is any other structural member provided on the surface of the heat dissipating portion 80b facing the interior of the housing 80, a region of the surface of the heat dissipating portion 80b facing the interior of the housing 80 without any other structural member may serve as the wall of the fifth channel V5.

In some implementations, a contour of a portion of the heat dissipating portion 80b adjacent to the fifth channel V5 includes an arc surface, the heat dissipating portion 80b further includes a plurality of first heat dissipating fins 91 extending into the fifth channel V5, and the plurality of first heat dissipating fins 91 may be arranged along the height direction of the housing 80. A direction in which the first heat dissipating fins 91 extending into the fifth channel V5 each extend is the same as a direction in which the fifth channel V5 extends. The direction in which the fifth channel V5 extends is the direction in which the air flows in the fifth channel V5. For example, the direction in which the air flows in the fifth channel V5 is arc-shaped, and the heat dissipating portion 80 includes a curved heat dissipating wall 90 and the plurality of first heat dissipating fins 91 disposed on the heat dissipating wall 90, and the heat dissipating wall 90, together with the side wall, the top wall and the bottom wall of the housing, encloses a closed space, a surface of the heat dissipating wall 90 facing the interior of the housing 80 is an arc surface, the surface of the heat dissipating wall 90 facing the interior of the housing 80 is provided thereon with the plurality of first heat dissipating fins 91, and an edge of each of the first heat dissipating fins 91 away from the heat dissipating wall 90 is arc-shaped.

With the first heat dissipating fins 91, the heat dissipating effect by the heat dissipating portion 80b for the interior of the housing 80 can be improved.

Further, as shown in FIG. 10, the heat dissipating portion 80b may further include a plurality of second heat dissipating fins 92 located between the first fan 83 and the fifth channel V5, the plurality of second heat dissipating fins 92 are sequentially arranged along the height direction of the housing 80, and the second heat dissipating fins 92 may be disposed on the heat dissipating wall 90.

The first air outlet of the first fan 83 is disposed facing the heat dissipating portion 80b, and an upwind surface is formed on a side of the second heat dissipating fins 92 close to the first fan 83, and the upwind surface and an air outlet surface of the first fan 83 have a same contour; or, the first air inlet of the first fan 81 is disposed facing the heat dissipating portion 80b, and a leeward surface is formed at a side of the second heat dissipating fins 92 close to the first fan 81, and the leeward surface and an air inlet surface of the first fan 83 have a same contour. With such design, the airflow can sufficiently flow between the plurality of second dissipating fins 92 and the first fan 83, thereby improving the heat dissipating effect of the second dissipating fins 92.

It should be noted that the air inlet surface of the first fan 83 refers to a surface where the first air inlet of the first fan 83 is located; the air outlet surface of the first fan 83 is a surface where the first air outlet of the first fan 83 is located.

In the embodiments of the present disclosure, a material of the heat dissipating portion 80b may include a metal material with better thermal conductivity, for example, may include aluminum, so as to improve the heat dissipating effect. Materials of the heat dissipating wall 90, the first heat dissipating fins 91 and the first heat dissipating fins 92 may be the same.

In some implementations, as shown in FIGS. 10 and 11, the projection apparatus may further include a light source heat dissipator 84 for dissipating heat from the light source, and the light source heat dissipator 84 is connected to the light source component for dissipating heat of the light source component. Specifically, as shown in FIG. 11, the light source heat dissipator 84 includes a heat sink component 841 and a heat conduction connecting element 842, the heat sink component 841 is connected with lamp panel 11a through the heat conduction connecting element 842. The heat sink component 841 may include a plurality of heat sink fins, which may be made of a metal material having good thermal conductivity. The heat conduction connecting element 842 and the lamp panel 11a may be formed into one piece.

In a case where the projection apparatus includes the light source heat dissipator 84, one of the first air inlet and the first air outlet of the first fan 83 is disposed facing the heat dissipating portion 80b, and the other of the first air inlet and the first air outlet of the first fan 83 is disposed facing the light source heat dissipator 84. In an implementation, the light source heat dissipator 84 generates more heat per unit time than the heat dissipating portion 80b, and therefore, in some implementations, the first air inlet of the first fan 83 is disposed facing the heat dissipating portion 80b, and the first air outlet of the first fan 83 is disposed facing the light source heat dissipator 84, which is more favorable for heat dissipation of the whole projection apparatus.

It should be noted that the expression related to the range, such as "from m1 to m2" appearing in the embodiments of the present disclosure, includes endpoint values m1 and m2.

It will be understood that the above embodiments are merely exemplary embodiments employed to illustrate the principles of the present disclosure, and the present disclosure is not limited thereto. It will be apparent to those skilled in the art that various changes and modifications may be made therein without departing from the spirit and scope of the present disclosure, and these changes and modifications are to be considered within the scope of the present disclosure.

What is claimed is:

1. A projection apparatus, comprising:
a light source component;
a light polarization component located on a light exiting side of the light source component and configured to convert light emitted from the light source component into first polarized light polarized in a first polarization direction;
a display panel located on a side, away from the light source component, of the light polarization component and configured to adjust the polarization direction in which the first polarized light is polarized, so as to emit second polarized light; a polarization direction in which the second polarized light is polarized is between the first polarization direction and a second polarization direction, and the first polarization direction is perpendicular to the second polarization direction;
a light reflective component located on a side, away from the light polarization component, of the display panel and configured to reflect one of the polarized light polarized in the first polarization direction and the polarized light polarized in the second polarization direction; and
a projection lens, a light incident surface of which faces the light reflective component so as to receive the light reflected by the light reflective component, wherein
the light source component comprises a light source, a second reflective layer, and a second lens;
the second lens is arranged between the light source and the light polarization component and is configured to collimate light directly irradiated to the second lens by the light source, and the second lens comprises a Fresnel lens;
the second reflective layer is located between the light source and the second lens and is arranged surrounding an optical axis of the second lens to form a cylindrical structure having a first opening facing the light source and a second opening facing the second lens, and an area of the first opening is smaller than that of the second opening;
wherein, the light polarization component comprises:
a transflective component configured to transmit the polarized light polarized in the first polarization direction and reflect at least a part of the polarized light polarized in the second polarization direction.

2. The projection apparatus of claim 1, wherein the light source comprises:
a lamp panel;
a light emitting device located on the lamp panel and located on a side, close to the display panel, of the lamp panel; and
a light collector located between the light source and the second lens and configured to converge the light emitted by the light emitting device.

3. The projection apparatus of claim 2, wherein the light source further comprises: a first reflective layer located on the lamp panel, the light emitting device and the first reflective layer are located on a same side of lamp panel, and at least part of an orthographic projection of the first reflective layer on the lamp panel is not overlapped with an orthographic projection of the light emitting device on the lamp panel.

4. The projection apparatus of claim 2, wherein the light collector comprises a plano-convex lens, a flat surface of the plano-convex lens faces the light emitting device, and a ratio of a distance from the light emitting device to the plane of the plano-convex lens to a distance from the plane of the plano-convex lens to the second lens ranges from 1:30 to 1:50.

5. The projection apparatus of claim 2, wherein a shape of a light exiting surface of the light emitting device is the same as a shape of a display surface of the display panel.

6. The projection apparatus of claim 5, wherein the light exiting surface of the light emitting device and the display surface of the display panel are both rectangular, a direction in which a long side of the light exiting surface extends is the same as a direction in which a long side of the display surface extends, and a direction in which a short side of the light exiting surface extends is the same as a direction in which a short side of the display surface extends;
a ratio of a length of the light exiting surface to a length of the display surface is 1:a, a ratio of a width of the light exiting surface to a width of the display surface is 1:b, a and b are both larger than 0, and a:b ranges from 0.8:1 to 1.2:1.

7. The projection apparatus of claim 5, wherein a distance from the second lens to the light emitting device is a first distance, and a focal length of the second lens is equal to the first distance; or,
the focal length of the second lens is xmm, and x is an integer closest to a value of the first distance and divisible by 5.

8. The projection apparatus of claim 1, wherein a divergence angle of light from the light source and a distance from the light source to the second lens satisfy that: assuming that the light emitted from the light source is irradiated to a plane where the second lens is located without being obstructed, a range where the light emitted from the light source is irradiated on the plane where the second lens is located completely covers the second lens.

9. The projection apparatus of claim 8, wherein the divergence angle of light from the light source and the distance from the light source to the second lens satisfy that: assuming that the light emitted from the light source is irradiated to the plane where the second lens is located without being obstructed, a ratio of an area of the second lens to an area of a light spot formed on the plane where the second lens is located ranges from 0.65:1 to 0.75:1.

10. The projection apparatus of claim 1, wherein the transflective component comprises an Advanced Polarizer Film (APF).

11. The projection apparatus of claim 1, wherein the light polarization component further comprises a transparent base, the transflective component is located on a side of the transparent base away from the display panel, and a gap exists between the transparent base and the display panel.

12. The projection apparatus of claim 1, further comprising a first lens;
wherein the light reflective component comprises a polarizer and a reflective mirror, the polarizer is located between the display panel and the reflective mirror, the first lens is located between the polarizer and the reflective mirror and is configured to converge the light exited from the polarizer and transmit the converged light to the reflective mirror;
or, the light reflective component comprises a plurality of optical film layers integrated together, the first lens is located between the display panel and the light reflective component, is configured to converge the light exited from the display panel and transmit the converged light to the reflective mirror.

13. The projection apparatus of claim 12, wherein the first lens is a Fresnel lens.

14. The projection apparatus of claim 12, wherein a focal length F of the projection lens, an image distance $l_2'$ of the projection lens, and an optical path distance $l_2$ from an intermediate plane to the projection lens satisfy the following formula (1):

$$\frac{1}{l_2'} = \frac{1}{F} + \frac{1}{l_2} \qquad (1)$$

a distance $l_1$ from the first lens to the display panel, a distance from the intermediate plane to the first lens, and a focal length f of the first lens satisfy the following formula (2):

$$\frac{1}{l_1'} = \frac{1}{f} + \frac{1}{l_1} \qquad (2)$$

the distance $l_1$ from the first lens to the display panel, the optical path distance $I_2$ from the intermediate plane to the projection lens, and an optical path distance $f_1'$ from the first lens to the projection lens satisfy the following formula (3):

$$l_1 = f_1' - \frac{1}{l_2} \cdot f_1'^2 \qquad (3)$$

wherein the intermediate plane is a virtual image surface formed by imaging the display panel by the first lens, and the intermediate plane and the display panel are located on a same side of the first lens.

15. The projection apparatus of claim 1, wherein the display panel comprises a plurality of pixel units arranged in an array, each of the pixel units comprises a red pixel region, a green pixel region, and a blue pixel region, the green pixel region has an area larger than each of areas of the red pixel region and the blue pixel region.

16. The projection apparatus of claim 15, wherein the area of the green pixel region is 1.05 to 1.1 times the area of the blue pixel region, and the area of the red pixel region is 0.9 to 0.95 times the area of the blue pixel region.

17. A projection apparatus, comprising:
a light source component;
a light polarization component located on a light exiting side of the light source component and configured to convert light emitted from the light source component into first polarized light polarized in a first polarization direction;
a display panel located on a side, away from the light source component, of the light polarization component and configured to adjust the polarization direction in which the first polarized light is polarized, so as to emit second polarized light; a polarization direction in which the second polarized light is polarized is between the first polarization direction and a second polarization direction, and the first polarization direction is perpendicular to the second polarization direction;
a light reflective component located on a side, away from the light polarization component, of the display panel and configured to reflect one of the polarized light polarized in the first polarization direction and the polarized light polarized in the second polarization direction; and
a projection lens, a light incident surface of which faces the light reflective component so as to receive the light reflected by the light reflective component, wherein
the light reflective component comprises a polarizer and a reflective mirror, the polarizer is located between the display panel and the reflective mirror and is configured to transmit one of the polarized light polarized in the first polarization direction and the polarized light polarized in the second polarization direction.

18. A projection apparatus, comprising:
a light source component;
a light polarization component located on a light exiting side of the light source component and configured to convert light emitted from the light source component into first polarized light polarized in a first polarization direction;
a display panel located on a side, away from the light source component, of the light polarization component and configured to adjust the polarization direction in which the first polarized light is polarized, so as to emit second polarized light; a polarization direction in which the second polarized light is polarized is between the first polarization direction and a second polarization direction, and the first polarization direction is perpendicular to the second polarization direction;
a light reflective component located on a side, away from the light polarization component, of the display panel and configured to reflect one of the polarized light polarized in the first polarization direction and the polarized light polarized in the second polarization direction; and
a projection lens, a light incident surface of which faces the light reflective component so as to receive the light reflected by the light reflective component, wherein
the light reflective component comprises a plurality of optical film layers integrated together, refractive indexes of any two adjacent optical film layers are different so as to form an optical interface therebetween, and each optical interface corresponds to a wave band, different optical interfaces correspond to different wave bands,
each optical interface is configured to transmit the polarized light with a wavelength within a corresponding wave band and polarized in the first polarization direction, and reflect the polarized light with a wavelength within a corresponding wave band and polarized in the second polarization direction, or
each optical interface is configured to transmit the polarized light with a wavelength within a corresponding wave band and polarized in the second polarization direction, and reflect the polarized light with a wavelength within a corresponding wave band and polarized in the first polarization direction.

19. The projection apparatus of claim 18, wherein the light reflective component is configured to transmit the polarized light polarized in the first polarization direction and reflect the polarized light polarized in the second polarization direction.

* * * * *